US008267771B2

(12) United States Patent
Wilson et al.

(10) Patent No.: US 8,267,771 B2
(45) Date of Patent: Sep. 18, 2012

(54) GAMING SYSTEM HAVING OUTCOMES INTERACTIVE WITH PLAYING FIELDS

(75) Inventors: Matthew Wilson, Brookfield, IL (US); Benjamin T. Gomez, Chicago, IL (US); Joel R. Jaffe, Glenview, IL (US); Jeremie Moll, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 254 days.

(21) Appl. No.: 12/675,770

(22) PCT Filed: Aug. 28, 2008

(86) PCT No.: PCT/US2008/010183

§ 371 (c)(1),
(2), (4) Date: Feb. 26, 2010

(87) PCT Pub. No.: WO2009/029271

PCT Pub. Date: Mar. 5, 2009

(65) Prior Publication Data

US 2010/0240436 A1 Sep. 23, 2010

Related U.S. Application Data

(60) Provisional application No. 60/966,974, filed on Aug. 31, 2007.

(51) Int. Cl.
*A63F 13/00* (2006.01)
*A63F 13/10* (2006.01)

(52) U.S. Cl. ................ 463/20; 463/16; 463/21; 463/22; 463/25; 273/138.1; 273/139; 273/243

(58) Field of Classification Search .............. 463/10–13, 463/16, 20–22, 25, 29, 40–42; 273/138.1, 273/139, 142 B, 142 A, 142 J, 148 A, 149 P, 273/149 R, 243, 292–293, 304, 306, 309; *A63F 13/00, 13/10*
See application file for complete search history.

(56) References Cited

U.S. PATENT DOCUMENTS

| | | | | |
|---|---|---|---|---|
| 5,868,619 | A * | 2/1999 | Wood et al. | 463/13 |
| 6,009,458 | A * | 12/1999 | Hawkins et al. | 709/203 |
| 6,126,542 | A | 10/2000 | Fier | |
| 6,179,711 | B1 * | 1/2001 | Yoseloff | 463/25 |

(Continued)

OTHER PUBLICATIONS

International Search Report for PCT/US2008/010183, dated Nov. 10, 2008 (1 page).

(Continued)

*Primary Examiner* — Arthur O. Hall
(74) *Attorney, Agent, or Firm* — Nixon Peabody LLP

(57) ABSTRACT

A gaming system comprises a wager input device and at least one display for displaying a primary wagering game and a secondary wagering game. The secondary wagering game comprises a playing field, the playing field having a set of field attributes associated therewith. The system further comprises a controller operative to (i) determine and display a first outcome of the primary wagering game, (ii) determine if a first set of game attributes associated with first outcome is eligible for play in the secondary wagering game, (iii) if the first outcome is eligible, determine a second outcome of the secondary wagering game by resolving the first set of game attributes with the set of field attributes in accordance with a first rule set, and (iv) if the second outcome is a winning outcome, award a first award.

20 Claims, 8 Drawing Sheets

U.S. PATENT DOCUMENTS

| | | | | |
|---|---|---|---|---|
| 6,186,505 | B1 * | 2/2001 | Perrie et al. | 273/274 |
| 6,312,334 | B1 * | 11/2001 | Yoseloff | 463/25 |
| 6,315,660 | B1 * | 11/2001 | DeMar et al. | 463/16 |
| 6,364,314 | B1 * | 4/2002 | Canterbury | 273/274 |
| 6,471,208 | B2 * | 10/2002 | Yoseloff et al. | 273/143 R |
| 6,656,040 | B1 * | 12/2003 | Brosnan et al. | 463/16 |
| 6,764,398 | B2 | 7/2004 | Stone et al. | |
| 6,802,774 | B1 * | 10/2004 | Carlson et al. | 463/16 |
| 6,860,810 | B2 * | 3/2005 | Cannon et al. | 463/20 |
| 6,875,106 | B2 | 4/2005 | Weiss et al. | |
| 7,144,322 | B2 * | 12/2006 | Gomez et al. | 463/20 |
| 7,267,611 | B2 * | 9/2007 | Slomiany et al. | 463/16 |
| 7,815,503 | B2 * | 10/2010 | Walker et al. | 463/20 |
| 2003/0064772 | A1 * | 4/2003 | Tempest et al. | 463/16 |
| 2007/0060245 | A1 | 3/2007 | Veenker | |
| 2007/0060247 | A1 | 3/2007 | Low et al. | |
| 2008/0045325 | A1 * | 2/2008 | Kato | 463/21 |
| 2008/0058083 | A1 * | 3/2008 | Saito | 463/20 |
| 2008/0064492 | A1 * | 3/2008 | Oosthoek | 463/26 |

OTHER PUBLICATIONS

Written Opinion for PCT/US2008/010183, dated Nov. 10, 2008 (5 pages).

International Preliminary Report on Patentability for PCT/US2008/010183, dated Mar. 2, 2010 (6 pages).

* cited by examiner

GAMING SYSTEM HAVING OUTCOMES INTERACTIVE WITH PLAYING FIELDS

CROSS REFERENCE TO RELATED APPLICATIONS

This application is a U.S. national stage filing of International Application No. PCT/2008/010183, filed Aug. 28, 2008, claiming priority from U.S. Provisional Application No. 60/966,974, filed Aug. 31, 2007, which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having outcomes interactive with playing fields.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

One form of bonus award which has been traditionally used is a playing field or board game. In traditional versions of such bonus games, players are provided with a playing field which they traverse or move, typically in a predetermined direction, path, or manner.

SUMMARY OF THE INVENTION

According to one aspect of the present invention, a gaming system comprises a wager input device and at least one display for displaying a primary wagering game and a secondary wagering game. The secondary wagering game comprises a playing field, the playing field having a set of field attributes associated therewith. The system further comprises a controller operative to (i) determine and display a first outcome of the primary wagering game, (ii) determine if a first set of game attributes associated with first outcome is eligible for play in the secondary wagering game, (iii) if the first outcome is eligible, determine a second outcome of the secondary wagering game by resolving the first set of game attributes with the set of field attributes in accordance with a first rule set, and (iv) if the second outcome is a winning outcome, award a first award.

According to another aspect of the invention, a gaming system comprises at least one wager input device, a first display for displaying a first primary wagering game, and a second display for display a second primary wagering game. The system further comprises a controller operative to (i) in response to receipt of a first wager from a first player, determine and display a first outcome of the first primary wagering game, (ii) collect a first set of game attributes from the first outcome, (iii) in response to receipt of a second wager from a second player, determine and display a second outcome of the second primary wagering game, (iv) collect a second set of game attributes from the second outcome, (v) upon the occurrence of a triggering event, display a third outcome of a secondary wagering game, the secondary wagering game comprising a playing field having a set of field attributes, wherein the third outcome is determined by resolving the first set of game attributes, the second set of game attributes and the set of field attributes in accordance with a first rule set, and (vi) award a first award if the third outcome is a winning outcome.

According to yet another aspect of the invention, a method of operating a wagering game comprises receiving a first wager from a first player, and in response to receiving the first wager, determining and displaying a first outcome of a first primary wagering game. The method further comprises receiving a second wager from a second player, and in response to receiving the second wager, determining and displaying a second outcome of a second primary wagering game. The method further comprises collecting a first set of game attributes from the first outcome, collecting a second set of game attributes from the second outcome, and upon the occurrence of a triggering event, displaying a secondary wagering game. The secondary wagering game comprises a playing field having a set of field attributes, wherein one or more outcomes of the secondary wagering game are determined by resolving the first set of game attributes, the second set of game attributes and the set of field attributes in accordance with a first rule set.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
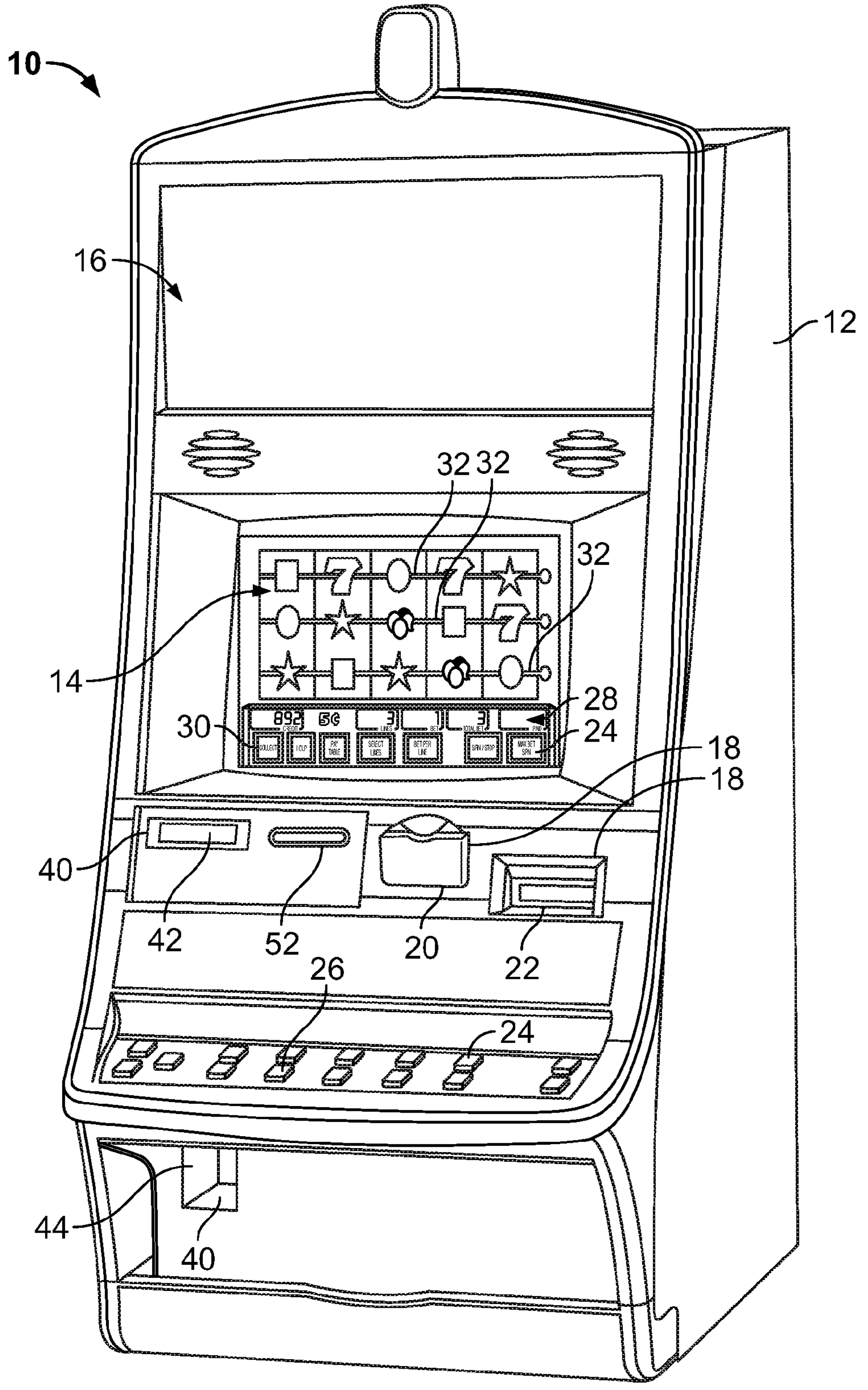
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
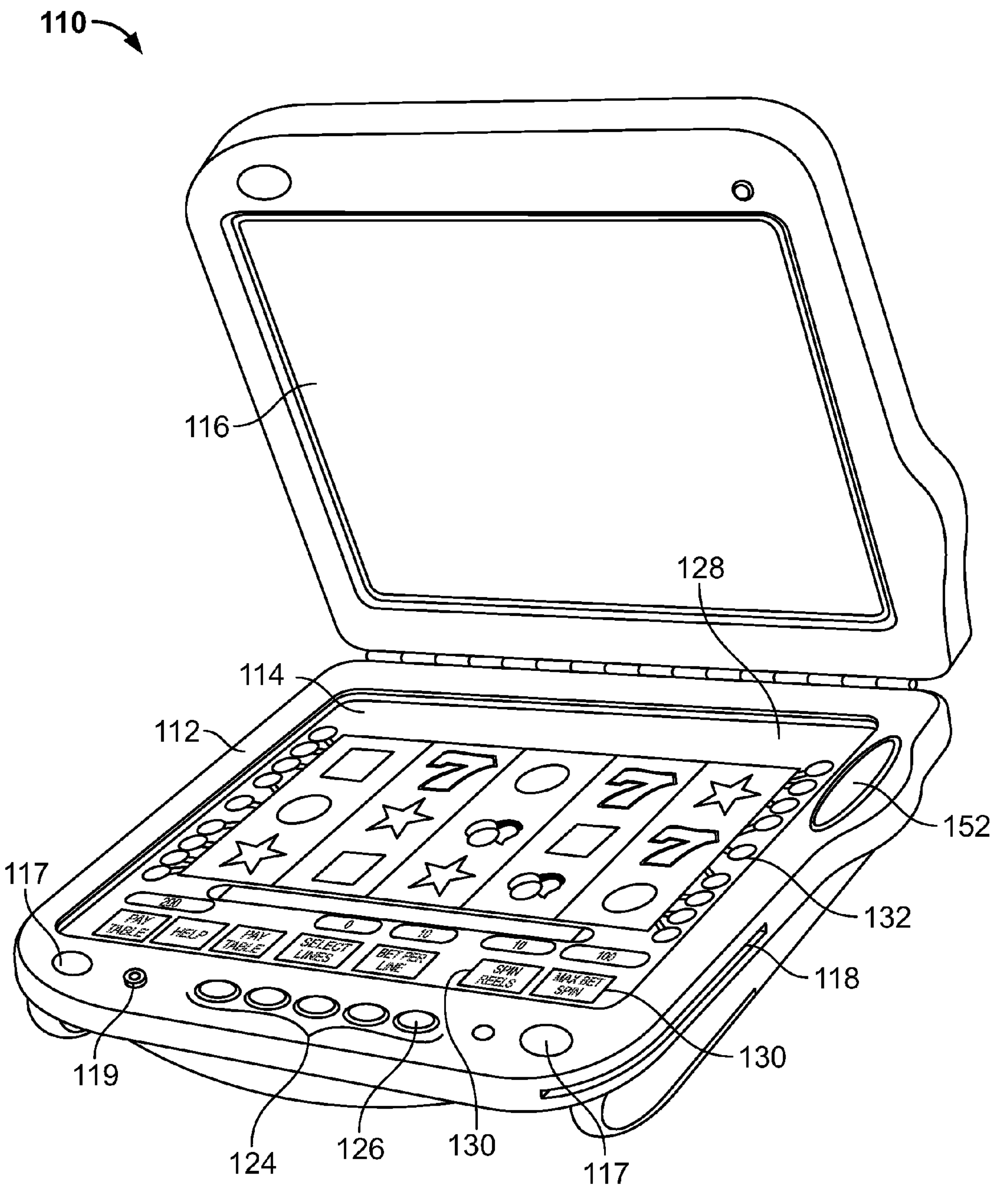
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
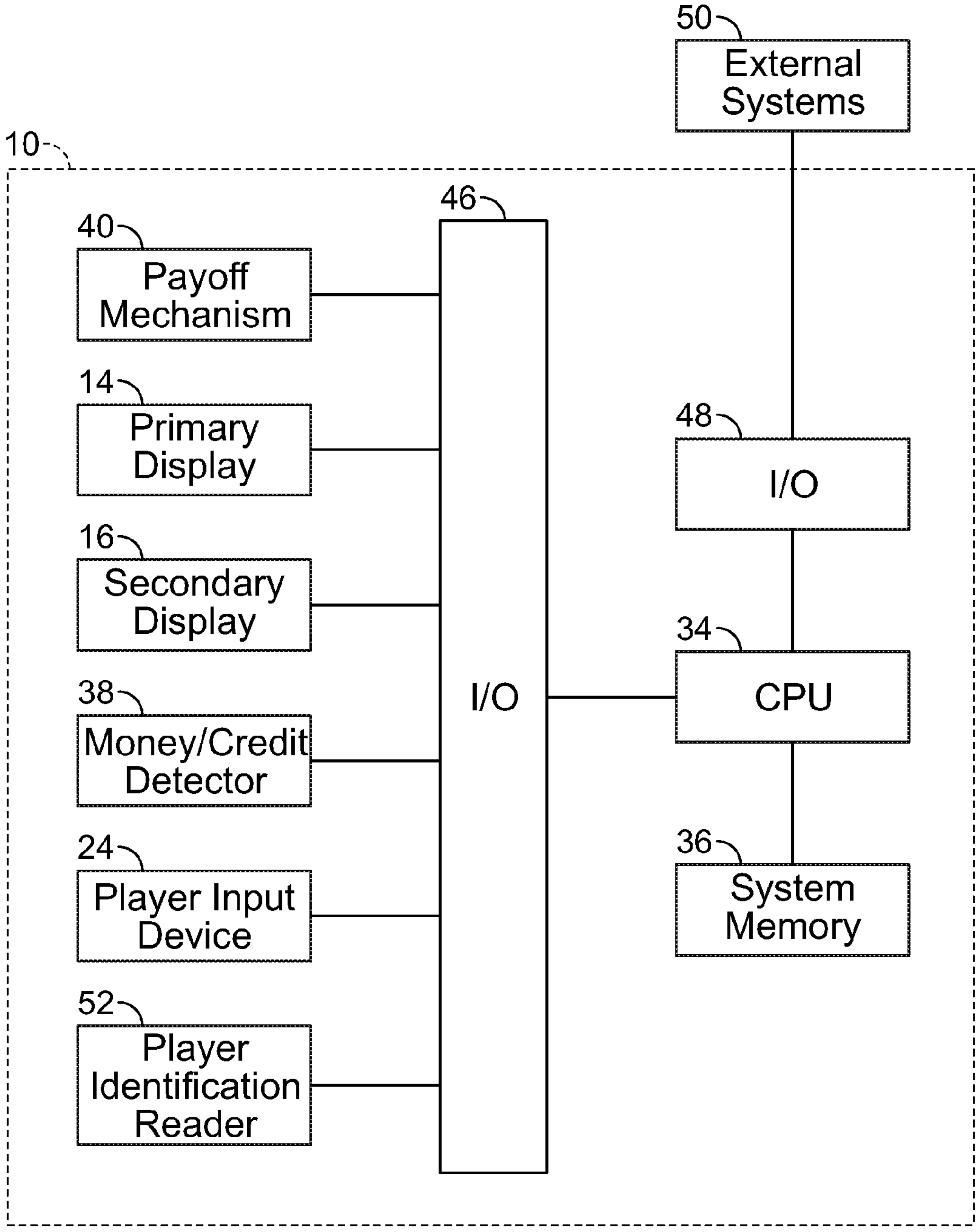
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1 a, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
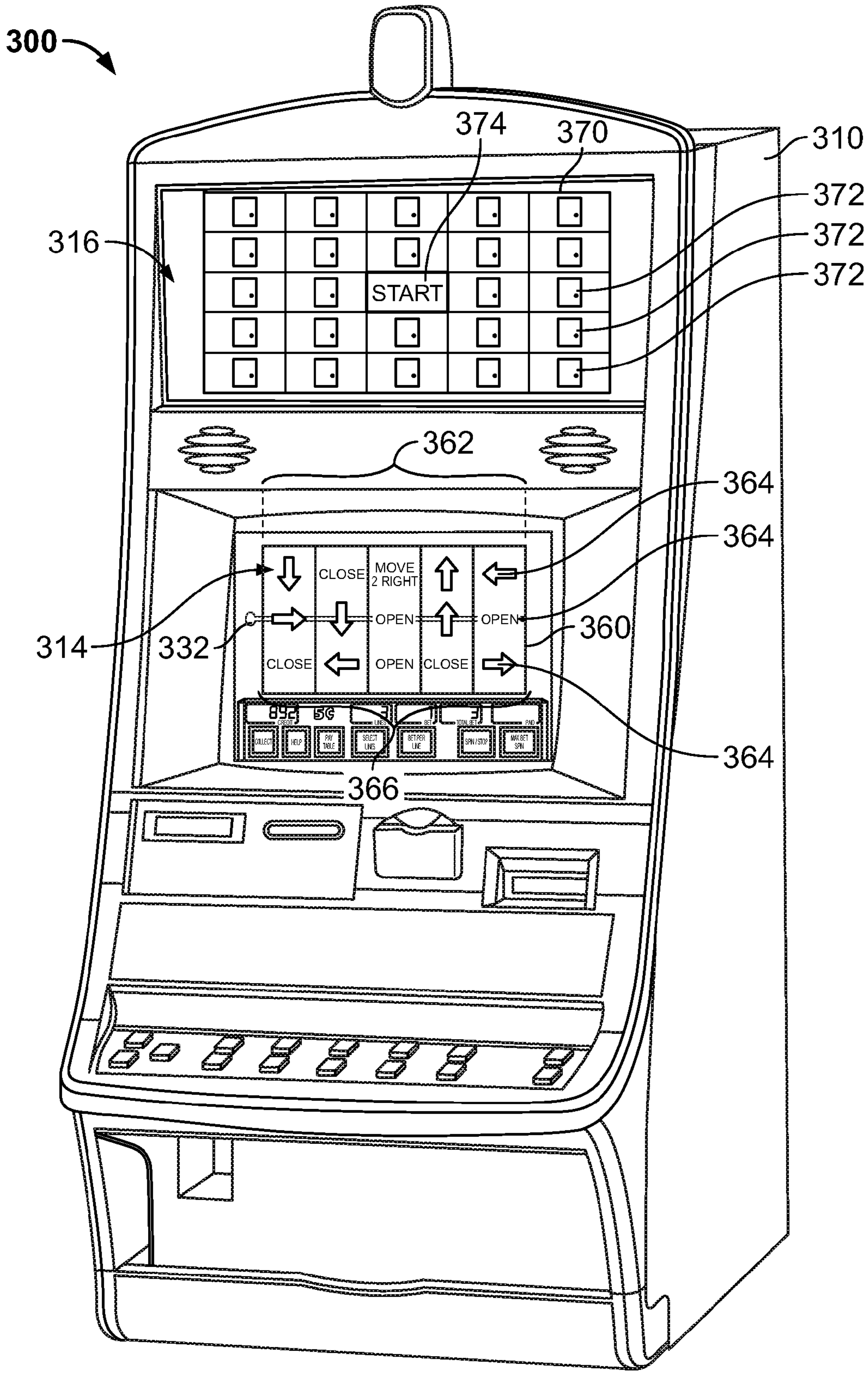
FIG. 3 is view of a gaming system displaying a primary wagering game in which outcomes are interactive with a playing field.

Turning now to FIG. 3, a primary display 314 of a gaming device 310 of a gaming system 300 is shown. The primary display 314 may be any form of display such as those described herein with reference to the free standing and handheld gaming devices of FIGS. 1*a* and 1*b*. The primary display 314 includes display of a primary wagering game 360, which in this embodiment is a slot game as shown in FIG. 3. The slot game 360 includes a plurality of reels 362*a,b,c,d,e* which may be either electro-mechanical reels or simulations thereof on the primary display 314. The reels 362*a,b,c,d,e* include a plurality of symbols 364 displayed thereon which vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol, or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is four rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The system 300 further includes a secondary display 316 which displays a playing field 370. The secondary display 316 may be mounted on the housing of the gaming device 310 supporting the primary display 314, or may be remote and separate from the gaming device 310, such as a community display or overhead signage display. The playing field 370 includes a plurality of elements 372 (in this case, doors) which conceal awards which may be awarded to the player. The playing field 370 further includes a Start region 374. The playing field 370 may include one or more varieties of field attributes 376. The field attributes 376 may include assets such as the awards concealed by the elements 372, the elements 372 themselves, or other attributes 376 such as paths along which a player must traverse the elements 372, rule sets for interaction with the elements 372, etc. For example, in an embodiment, the field attributes 376 may include locks on the doors of the elements 372 for which a player will need an associated key to open. In other embodiments, the attributes 376 may include many other assets, tools, inputs or instructions.

In an embodiment, prior to play of the wagering game commencing, the playing field 370 is created, established and populated, either randomly, or in accordance with one or more rule sets or algorithms. The creation and/or population of the playing field 370 includes the assignment of various field attributes 376 to the playing field 370, and configuration 376 of those attributes 376. Thus, in an embodiment, creation and population of the playing field 370 includes random selection of awards to be concealed behind the elements 372, and assignment of various rules required to uncover or open an element 372 so as to be eligible to receive the associated award behind the element 372. In other embodiments, the plurality of field attributes 376 may be configured in other ways.

The primary wagering game 360 includes symbols 364 which are associated with game attributes 380. Thus, as seen in FIG. 3, the symbols 364 include directional arrows and interaction commands. The symbols 364 include up, down, right and left arrows. Other symbols 364 provide instructions as to what is to occur, such as Open and Close, referring to opening and closing doors (elements 372) of the playing field 370. Yet other instructions such as "Move 2 Right" are seen as symbols 364 in the primary wagering game. Thus, in an embodiment, each symbol 364 includes at least one game attribute 380 associated with it.

Figure 4:
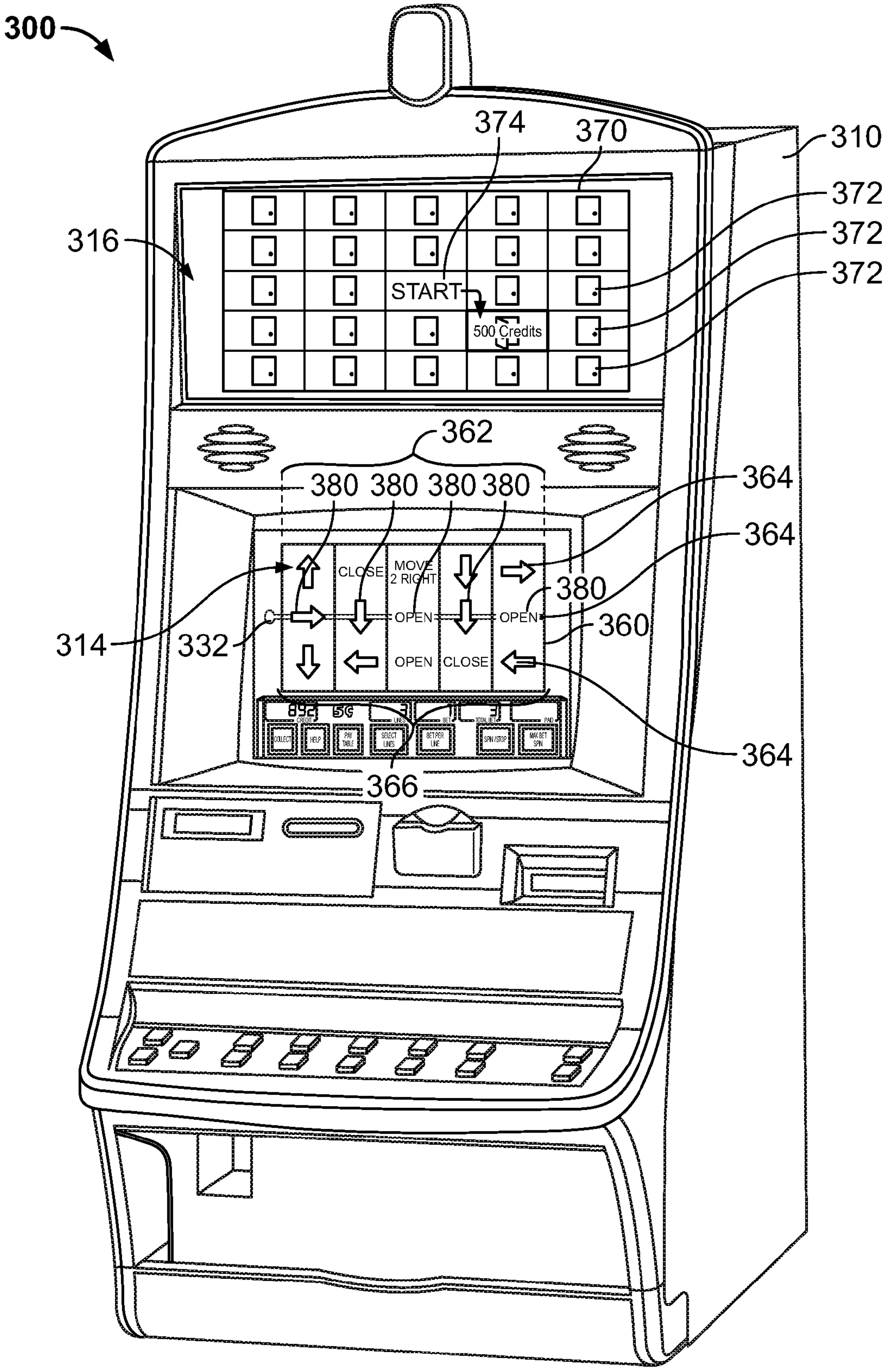
FIG. 4 is a view of the gaming system of FIG. 3, in which a portion of a first outcome is revealed.

Turning to FIG. 4, a play of the wagering game 360 is displayed. During play of the game, a random number generator is employed to determine, present and display a randomly selected outcome of the primary wagering game 360 as seen in FIG. 4. In this embodiment, randomly selected outcomes are evaluated for winning outcomes, or playable outcomes, on at least one active payline 332. Thus, in FIG. 3, the symbols 364 landing on the active payline 332 are a right arrow, a down arrow, an Open instruction, a down arrow, and another Open instruction. Each of the symbols 364 in the outcome shown is associated with a game attribute 380 (movement or other instruction, in this embodiment). Thus, the arrangement of the symbols 364 on the payline 332 effectuates a set of game instructions used for interaction with the playing field 370. In other words, the symbols 364 and their associated game attributes 380 are used as inputs to play or interact with the playing field 370.

Thus, the outcome on the active payline 332 is evaluated by using the attributes 380 of the outcome to interact with the playing field 370 and the elements 372 thereon. Because the first three symbols 364 on the active payline 332 are right arrow, down arrow, and open, the player is permitted to interact with the playing field 370 by commencing at the Start region 374 and utilizing the game attributes 380 of the symbols 364 to move one space to the right, move open space down, and then "open" the door corresponding the element 372 at that location. Thus, the playing field 370 on the secondary display 316 is shown with the player's position moving accordingly one to the right of the Start region 374, then one space down, and opening the element 372 at that location to reveal an award of 500 credits, which are awarded to the player.

Figure 5:
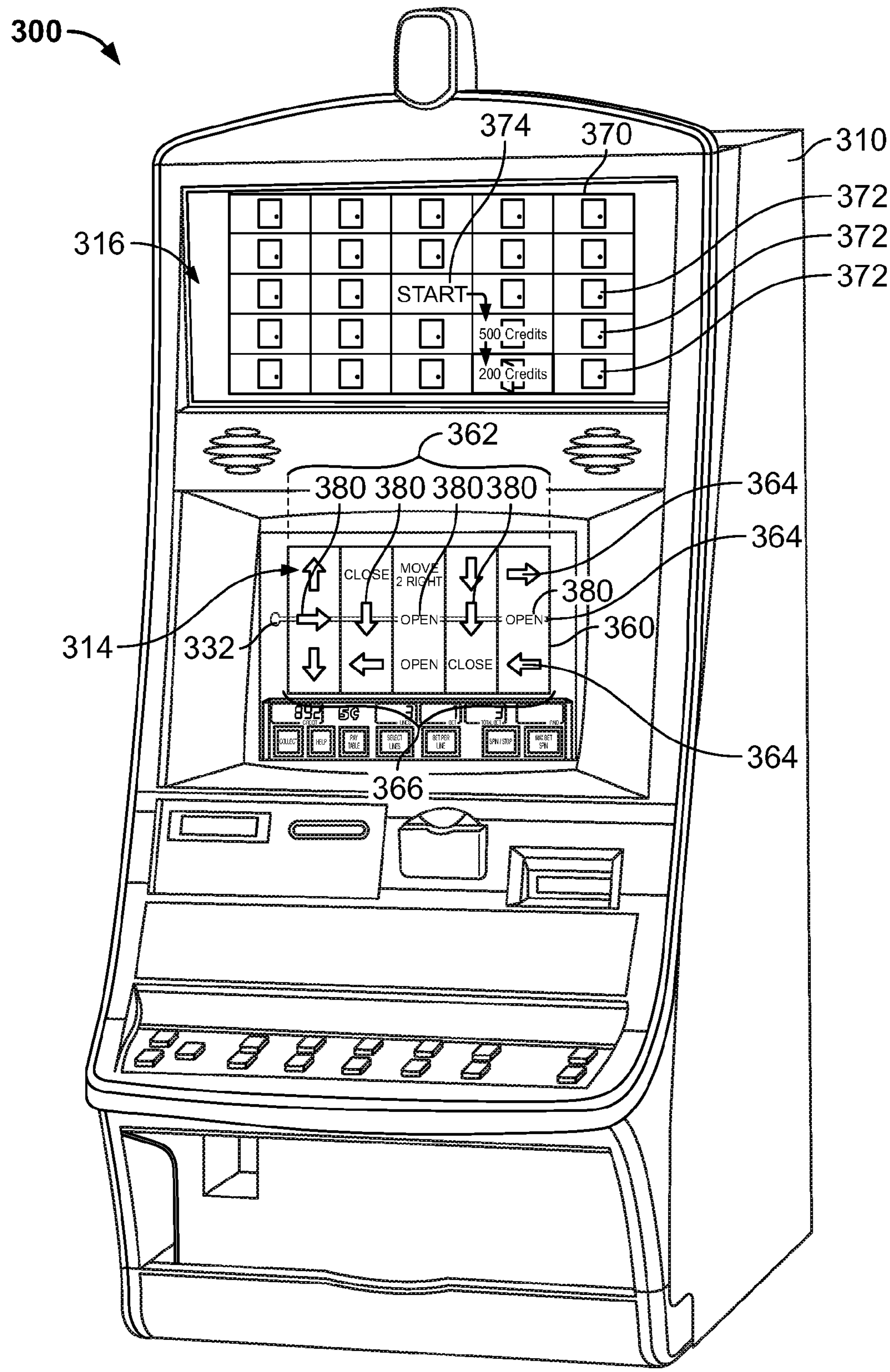
FIG. 5 is a view of the gaming system of FIG. 3, in which a further portion of a the first outcome is revealed.

Turning to FIG. 5, the remainder of the outcome on the active payline 332 is a down arrow and another Open instruction. Thus, play of the game continues with the player's position on the playing field 370 again operating under the instructions of the game attributes 380 associated with the symbols 364. As seen, the player moves yet another position down, and opens the door of the element 372 at that location to reveal another award, which in this instance is 200 credits. Thus, the interaction of the game attributes 380 associated with the symbols 364 of a winning combination, and the field attributes 376 associated with the elements 372 of the playing field 370 determine the outcome of a play of the wagering game, and the awards, if any, that the player will receive. In this embodiment, the arrangement of the symbols 364 on the primary display 314 is not in and of itself evaluated for winning combinations of symbols in accordance with a paytable. Rather, the symbols 364 which land on the payline 332 only provide input or interactivity into the playing field 370, which involves the resolution of the game attributes 380 vis-à-vis the field attributes 376. In other embodiments, the symbols 364 of the primary wagering game 360 may also be evaluated against a paytable for possible winning combinations, and receive awards therefore.

Figure 6:
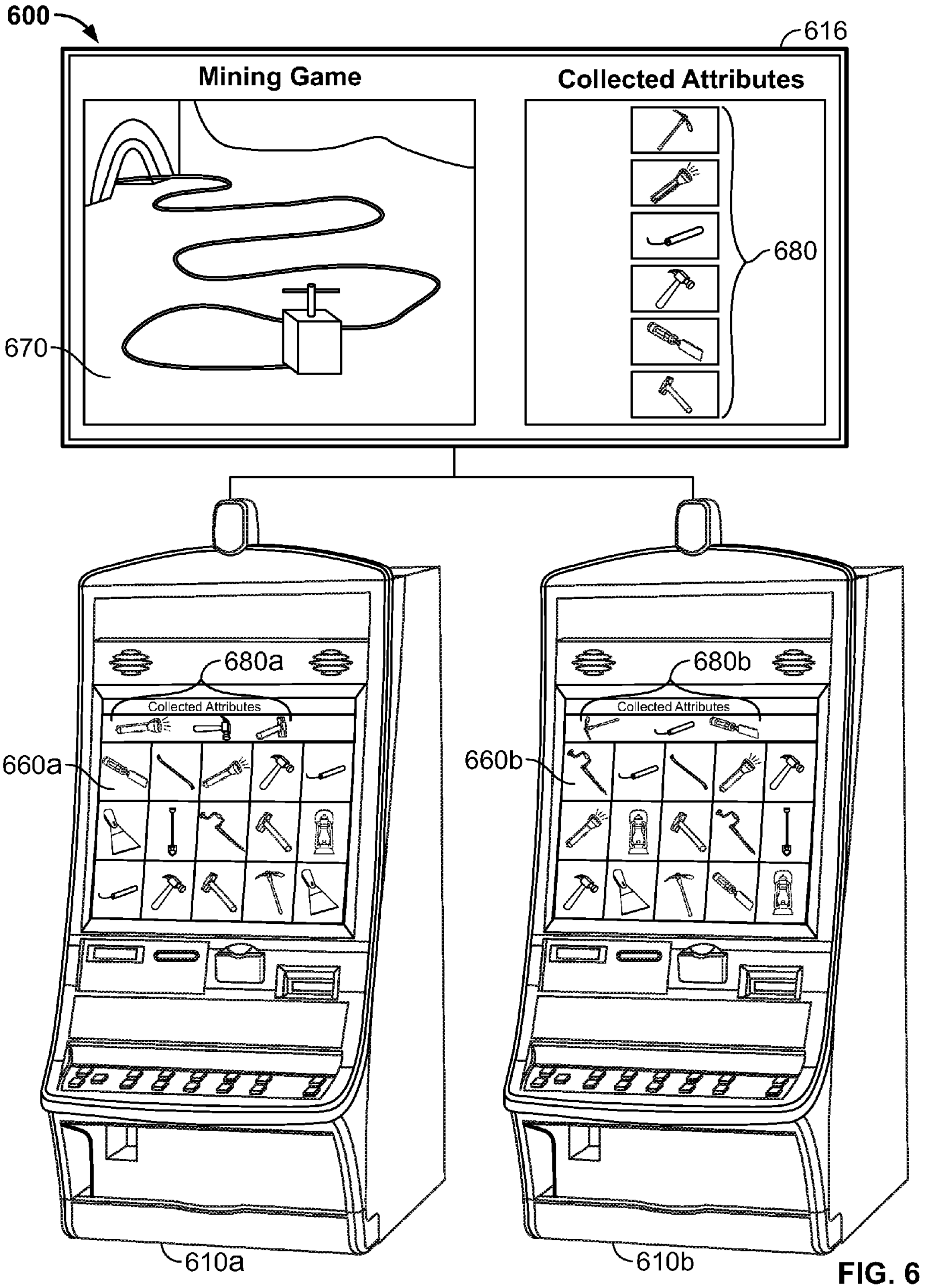
FIG. 6 is a view of a gaming system displaying a plurality of primary wagering games interactive with a playing field.

Turning to FIG. 6, an alternative embodiment of a gaming system 600 is displayed, which includes a plurality of gaming devices 610*a,b*, and a secondary display 616, in the form of a community display mounted above the gaming devices 610*a, b*. Each of the gaming devices 610*a,b* displays a primary wagering game 660*a,b*, which in this instance has a theme of a "mining game" in which players participate in a mining for treasure adventure. As players play their individual primary wagering games 660*a,b* they collect certain game assets or attributes 680*a,b*, which in this embodiment are collected and displayed along a top portion of each of the primary displays 614*a,b*. Thus, in an embodiment, a player participates in his or her primary wagering game 660*a,b* independent of other primary wagering games 660*a,b* on the system 600. Moreover, a player individually and independently collects his or her own game attributes 680*a,b*. In an embodiment, game attribute 680*a,b* are collected as a result of outcomes of the primary wagering game 660*a,b*. As seen in FIG. 6, a first player has collected game attributes 680*a* which include a flashlight, a hammer and sledgehammer. A second player has collected game attributes 680*b* which include a pick axe, a stick of dynamite, and a chisel.

Upon the occurrence of a triggering event, the players at the various gaming devices 610*a,b* participate and interact with the playing field 670 displayed on the secondary display 616. In an embodiment, the bonus event displayed on the playing field 670 involves a collaborative effort or team play of a game, using the game attributes 680 collected by all players. Thus, along the right hand side of the secondary display 616 are displayed the communal set of collected game attributes 680, which include the game attributes 680*a* collected by the first player and the game attributes 680*b* collected by the second player. In this embodiment, the bonus game played on the playing field 670 is a mining game adventure in which the players, as a team, traverse a mine. Players use the collected game attributes 680 to overcome obstacles in the playing field 670, receive awards for how far they progress in the game. The awards may be any form of award, including credit amounts, multipliers, cash, free spins, or entry into other bonus games or events. Thus, in such an embodiment, the players participate jointly in a secondary game on a communal playing field 670, using an accumulation of individual game attributes 680.

Figure 7:
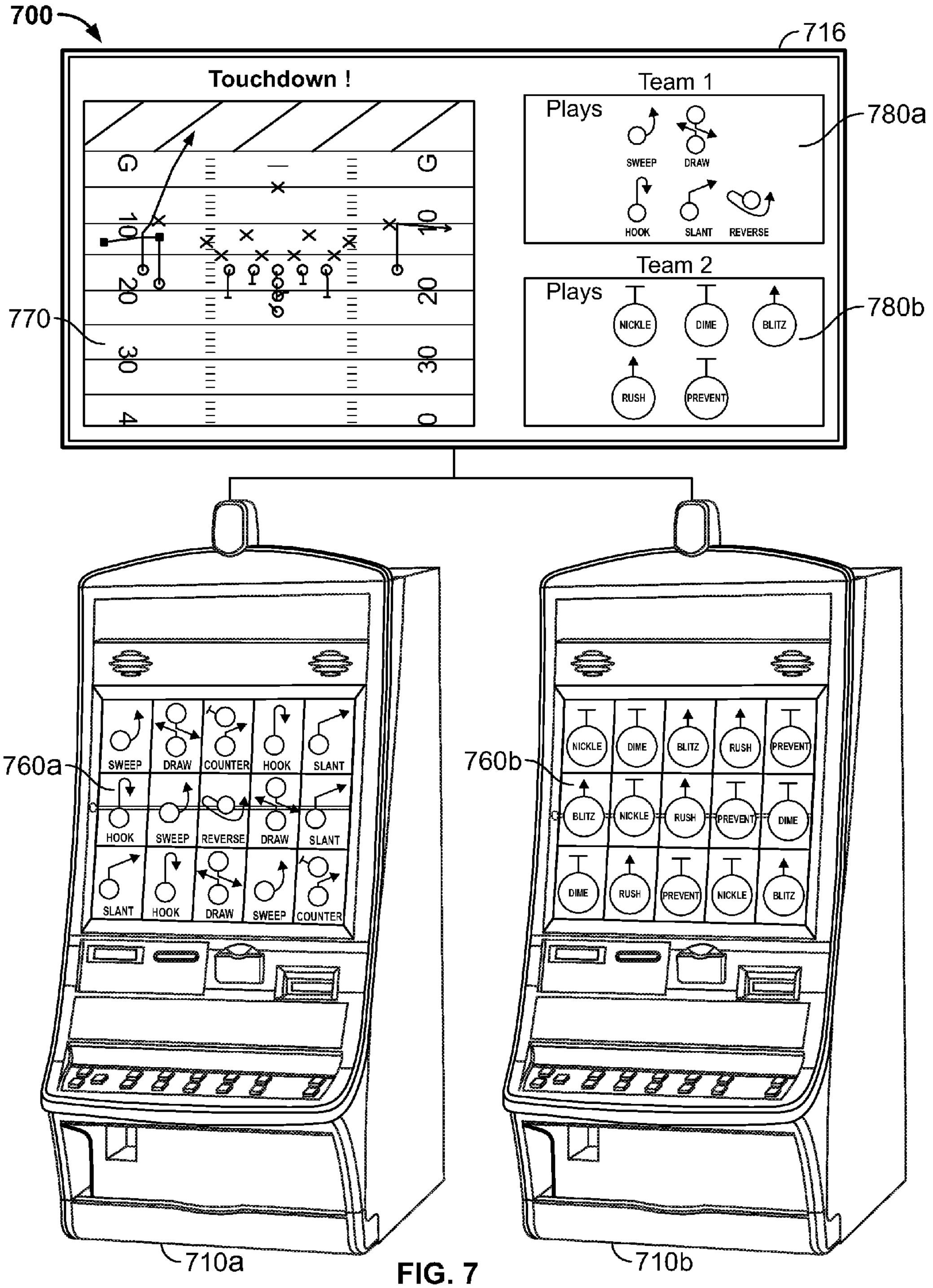
FIG. 7 is a view of an alternative embodiment of a gaming system displaying a plurality of primary wagering games interactive with a playing field.

Turning to FIG. 7, yet another embodiment of a gaming system 700 is displayed, in which are plurality of gaming devices 710*a,b* are in communication with a secondary display 716 which is a community display mounted above the devices 710*a,b*. Each of the gaming devices 710*a,b* displays a primary wagering game 760*a,b*, which in this instance has a theme of a "football contest" in which players participate in against one another in a sporting event. As players play their individual primary wagering games 760*a,b* they collect certain game assets or attributes 780*a,b*, which may be displayed to the player on either one of the primary displays 714*a,b* or on the secondary display 716. Thus, in an embodiment, a player participates in his or her primary wagering game 760*a,b* independent of other primary wagering games 760*a,b* on the system 700. Moreover, a player individually and independently collects his or her own game attributes 780*a,b*. In an embodiment, game attributes 780*a,b* are collected as a result of outcomes of the primary wagering game 760*a,b*. Thus, as seen in FIG. 7, the game attributes 760*a,b* of this configuration of the system 700 are offensive and defensive plays to be utilized in a football contest. The first player at the first gaming device 710*a* collects game attributes 780*a* which are offensive football plays while the second player at the second gaming device 710*b* collects game attributes 780*b* which are defensive football plays.

Upon the occurrence of a triggering event, the players at the various gaming devices 710*a,b* participate and interact with the playing field 770 displayed on the secondary display 716. In an embodiment, the bonus event displayed on the playing field 770 involves a competitive effort among the players, which are engaged in a contest against one another in which each player uses the game attributes 780*a,b* collected by that player. Thus, along the right hand side of the secondary display 716 are displayed the sets of collected game attributes 780*a,b* collected by each player, which include the game attributes 780*a* (offensive players) collected by the first player and the game attributes 780*b* (defensive plays) collected by the second player. In this embodiment, the bonus game played on the playing field 770 is a football game in which the players compete.

Players use the collected game attributes 780*a,b* to select plays which are played and displayed on the playing field 770. Specifically, in one embodiment, players can select from their arsenal of plays and the selected offensive play is compared to the selected defensive play in accordance with a rule set, which is then resolved to determine an outcome. For example, it may be that certain offensive plays have a much better success rate against certain defensive plays, but a very low success rate against other defensive plays. If the offensive player selects a run up the middle while the defensive player selects a blitz, it is likely, according to the rule set, that the offensive play will not be very successful, and as such is displayed as such on the playing field 770 of the secondary display 716 (perhaps shown as a tackle for a loss of yardage). On the other hand, if the player selects a long pass (as shown in FIG. 7) while the defense selects a blitz, it is likely that the play is very successful, resulting in a score or touchdown. Depending on the outcomes of the resolution of the selected plays, one or more players may be awarded awards in the form of credits, prizes, cash, free spins, multipliers, or entry into other bonus events or games.

Moreover, it should be recognized that in the embodiments shown and described in FIGS. 6 & 7, the playing fields 670, 770 themselves may be configured to have their own set of playing field attributes. For example, in the football game of FIG. 7, the playing field 770 may have field attributes such as weather (snowy, windy, rainy, etc.), playing surface type (grass, astroturf, etc.) and stadium type (indoor, outdoor). These field attributes may be utilized and configured such that the rule set which resolves the outcome of certain plays of the game has to factor in the field attributes as well as the individually selected game attributes 780*a,b*. Thus, a player who might be very successful with passing offensive plays in the football contest, may not be so successful if the weather is rainy or windy. Moreover, the player may be even more successful if the stadium is an indoor stadium and wind is not a factor. In this way, the playing field 770 itself has its own set of field attributes which must be resolved by the rule set in conjunction with the game attributes 780 in order to determine the outcome of certain events in the secondary or bonus game.

In some embodiments, the order or arrangement of symbols in the outcome of the primary wagering game affects the outcome of the secondary wagering game, and the interaction of the game attributes with the playing field attributes. For example, as seen in FIGS. 3-5, the order of the symbols 364 on the payline 332 affects the outcome on the playing field 370 in that the symbols 364, and the game attributes 380 associated therewith, are applied left to right along the payline 332. In other embodiments, the symbols and associated attributes may be applied to the playing field randomly, in some other predetermined order or in accordance with one or more rule sets or algorithms.

The playing field, in some embodiments, is displayed on a community display as seen in FIGS. 6 and 7. However, in other embodiments, the playing field may be displayed on existing primary displays (displaying primary wagering games), either on free standing or handheld gaming devices. Moreover, the playing field may be displayed on a secondary or "top box" display on a gaming device, such as the secondary display 16 in FIG. 1*a*. In yet other embodiments, the playing field may be displayed on other displays, such as an LCD, a transmissive LCD, a CRT, an LED display, etc. Moreover, the playing field may be presented concurrently on multiple displays, either in whole, or in part on each display.

Primary and secondary wagering games can be configured in a large variety of manners so as to take advantage of the playing field. For example, the wagering game may be a single player wagering game in which random outcomes of the primary wagering game generate game attributes which interact with the field attributes of the playing field so as to navigate a player through the playing field in an attempt to reach a variety of goals, prizes, awards, etc. In another embodiment, the player may play against a computer character who is attempting to reach or collect the same goals, prizes or awards (or different ones). Many multi-player configurations may be utilized such as the competitive and collaborative examples described herein. Players may be organized in various groups or teams, and then the teams may be permitted to play in competitions against one another.

Various themes and configurations may be utilized with the playing field and primary wagering game to provide many variations of wagering game experiences. In one embodiment, the wagering games may be configured such that the playing field is a competition between two pirate ships which are sailing and firing weaponry at one another in an effort to defeat the other. The primary wagering game outcomes may generate game attributes such as a variety of weapons, types of offensive attacks, and speed and direction of the ship. For example, the reel symbols and the associated game attributes may include short range, medium range, and long range cannon ball shots. Other game attributes may be direction and speed of travel of the ship. Playing field attributes which affect both ships, may include factors such as wind direction and speed. In one embodiment, players take turns firing shots and navigating their ships based upon outcomes in the primary wagering games. Play may continue until a player has sunk his opponents ship, or achieved some other milestone, such as collecting a sufficient number of credits or points, or inflicting a certain amount of "damage" to his opponent's vessel.

Players may be given options as to when and where to start play of the secondary and/or primary wagering games. For example, players may receive a "restart" option so as to restart or reset the playing field and begin interacting with a new "board" or "field." Moreover, players may be permitted to select from a plurality of available playing fields, so as to customize their gaming experience. In other embodiments, a playing field may be further subdivided into levels, tiers, stages, or zones. For example, a player may participate on a certain level, stage or episode, until certain criteria are satisfied (completing the stage, collecting a certain amount of credits, striking out, etc.). Then the player may be permitted to move on to a different level, stage or episode. In other embodiments, a playing field may be divided into zones. Different rule sets may apply to different zones, such that play in each zone is unique. Moreover, the playing field attributes in each zone may be different. For example, in the mining game of FIG. 6, one zone may be a shallower level of the mine where digging is easier and awards are more plentiful, and a second zone may be a deeper level of the mine where digging is harder and awards are more scarce.

Moreover, the themes of the games may include board games such Monopoly™, Battleship™, Sudoku, etc. In such a configuration, the playing field may include a visual display of the board relevant to the game theme. The primary wagering games of the system may generate outcomes including game assets which allow players to traverse the board, and interact with the playing field. The "board" may include spaces with instructions and actions which a player may or must undertake. Such spaces and instructions comprise field attributes of the playing field. Other thematic configurations may include any form of team play, collaboration, competition, or solo play.

It should be understood that the symbols of the primary wagering game having game attributes associated therewith may be the entire primary wagering game, or may be only a portion thereof. For example, the primary wagering game may generate symbols and game attributes on every play. In another embodiment, the primary wagering game may generate game attributes only on certain plays of the game, for example during a free spin event or a tournament. Moreover, the symbols of the reels, in addition to generating game attributes, may also generate winning combinations for which awards are paid in accordance with one or more pay tables of the system.

A variety of triggering events may cause the secondary wagering event to commence such that the game attributes collected are used, played, or interact with the playing field. In some embodiments, the triggering event may be the collection of a predetermined set of game attributes. In other embodiments, the triggering event may be a randomly generated event. In yet other embodiments, eligibility rules may apply which are the same as or distinct from the triggering event. The eligibility rules may govern which players, if any, are permitted to participate in the secondary event. For example, a player may only be permitted to participate in the secondary event if he has placed a maximum wager on the primary wagering game. In another embodiment, the eligibility rules may require a player to have collected one or more of each type of available game attribute in order to play the secondary wagering game. Thus, for example, in the football event described and depicted in FIG. 7, it may be necessary for a player to have collected game attributes including at least one running play, one passing play, on running defense, and one passing defense in order to be able to play the football themed secondary wagering game.

Game attributes may include a variety of different assets. For example, collectible game attributes may include speed, distance, energy levels, shields, anti-terminators, strength, direction, velocity, acceleration, tools, etc. Moreover, two or more of the available game attributes may have interdependencies on one another. For example, it may be that certain game attributes are only usable in conjunction with, or in certain manners, with other game attributes. Thus, in an example, a weapon game attribute may only be usable in conjunction with an ammunition asset. In another example, a player can only operate a vehicle, such as a boat, if he has accumulated a direction game attribute and a speed game attribute. Many other examples are possible.

The systems and methods described herein offer a number of benefits and advantages over traditional gaming systems. The interaction of the game attributes collected in the primary wagering game with the playing field attributes provided in the playing field of the secondary wagering game provide a unique and entertaining display. Specifically, a player's entertainment and enjoyment is heightened by being able to observe the accumulation of game attributes and anticipate the possible outcomes of the interaction of those game attributes in the playing field. Moreover, because multiple types of game attributes are provided, unique experiences are provided in the secondary wagering game, which decreases the likelihood of a player becoming bored or disinterested in the gaming system. Additionally, the population of the playing field with field attributes which affect, interact, and are resolved against the game attributes played ensure even a more unpredictable, and therefore enjoyable experience.

Each of these embodiments and obvious variations thereof is contemplated as falling within the spirit and scope of the claimed invention, which is set forth in the following claims.

What is claimed is:

1. A gaming system comprising:

a wagering game machine comprising a wager input device;

at least one display for displaying a primary wagering game and a secondary wagering game, the secondary wagering game comprising a playing field, the playing field having a set of field attributes associated therewith; and at least one controller operative to, responsive at least in part to an input wager:

(i) determine and display a first outcome of the primary wagering game;

(ii) determine if a first set of game attributes associated with the first outcome is eligible for play in the secondary wagering game, the first set of game attributes comprising a plurality of attribute types, the plurality of attribute types collectively defining at least one executable function in the playing field;

(iii) if the first outcome is eligible, determine a second outcome of the secondary wagering game by resolving the first set of game attributes with the set of field attributes in accordance with a first rule set, and (iv) if the second outcome is a winning outcome, award a first award.

2. The system of claim 1, wherein the primary wagering game includes a plurality of symbols arranged in an array, each of the plurality of symbols associated with at least one game attribute in the first set of game attributes.

3. The system of claim 2, wherein a first symbol of the plurality of symbols is associated with a first game attribute in the first set of game attributes and a second symbol of the plurality of symbols is associated with a second game attribute in the first set of game attributes.

4. The system of claim 3, wherein the first set of game attributes is associated with a first set of symbols landing on an activated payline traversing the array of the primary wagering game.

5. The system of claim 4, wherein the resolution of the first set of game attributes with the set of playing field attributes is dependent upon an order in which the first set of symbols appear on the activated payline.

6. The system of claim 1, wherein the playing field includes a plurality of awards, including the first award.

7. The system of claim 1, wherein the playing field is divided into at least a first zone and a second zone, wherein the first rule set is applicable to the first zone, wherein a second rule set is applicable to the second zone.

8. A gaming system comprising:

a wagering game machine;

a wager input device;

at least one display operatively associated with the wagering game machine, the at least one display being configured to display a wagering game comprising first portion and a second portion, the second portion comprising a playing field, the playing field having a set of field attributes associated therewith; and at least one controller operative to, responsive at least in part to an input wager:

(i) determine a first outcome of a first portion of the wagering game;

(ii) display on the at least one display the first outcome of a first portion of the wagering game;

(iii) determine if a first set of game attributes associated with the first outcome is eligible for play in a second portion of the wagering game, the first set of game attributes comprising a plurality of attribute types, the plurality of attribute types collectively defining at least one executable function in the playing field;

(iv) determine a second outcome of the second portion of the wagering game, if the first outcome is eligible, by resolving the first set of game attributes with the set of field attributes in accordance with a first rule set; and (v) award a first award if the second outcome is a winning outcome.

9. The system of claim 8, wherein the first portion of the wagering game includes a display on the display of a plurality of symbols arranged in an array, each of the plurality of symbols associated with at least one game attribute in the first set of game attributes.

10. The system of claim 9, wherein a first symbol of the plurality of symbols is associated with a first game attribute in the first set of game attributes and a second symbol of the plurality of symbols is associated with a second game attribute in the first set of game attributes.

11. The system of claim 10, wherein the first set of game attributes is associated with a first set of symbols landing on an activated payline traversing the array of the first portion of the wagering game.

12. The system of claim 11, wherein the resolution of the first set of game attributes with the set of playing field attributes is dependent upon an order in which the first set of symbols appear on the activated payline.

13. The system of claim 8, wherein the playing field includes a plurality of awards, including the first award.

14. The system of claim 8, wherein the playing field is divided into at least a first zone and a second zone, wherein the first rule set is applicable to the first zone, wherein a second rule set is applicable to the second zone.

15. A method of operating a wagering game on a wagering game machine comprising:

receiving a first wager from a first player via a wager input device of the wagering game machine;

displaying, on at least one display of the wagering game machine, a wagering game comprising first portion and a second portion, the second portion comprising a playing field, the playing field having a set of field attributes associated therewith;

determining, using at least one controller, a first outcome of a first portion of the wagering game;

determining, using the at least one controller, if a first set of game attributes associated with the first outcome is eligible for play in a second portion of the wagering game, the first set of game attributes comprising a plurality of attribute types, the plurality of attribute types collectively defining at least one executable function in the playing field;

determining, using the at least one controller, if the first outcome is eligible, a second outcome of the second portion of the wagering game by resolving the first set of game attributes with the set of field attributes in accordance with a first rule set, and awarding a first award if the second outcome is a winning outcome.

16. The method of claim 15, wherein the first portion of the wagering game includes a display on the display of a plurality of symbols arranged in an array, each of the plurality of symbols associated with at least one game attribute in the first set of game attributes.

17. The method of claim 15, wherein a first symbol of the plurality of symbols is associated with a first game attribute in the first set of game attributes and a second symbol of the plurality of symbols is associated with a second game attribute in the first set of game attributes.

18. The method of claim 15, wherein the first set of game attributes is associated with a first set of symbols landing on an activated payline traversing the array of the first portion of the wagering game.

19. The method of claim 15, wherein the resolution of the first set of game attributes with the set of playing field attributes is dependent upon an order in which the first set of symbols appear on the activated payline.

20. The method of claim 15, wherein the playing field includes a plurality of awards, including the first award.

* * * * *